(12) United States Patent
Geoffrion et al.

(10) Patent No.: US 11,489,789 B2
(45) Date of Patent: Nov. 1, 2022

(54) TECHNOLOGIES FOR ADAPTIVE NETWORK PACKET EGRESS SCHEDULING

(71) Applicant: Intel Corporation, Santa Clara, CA (US)

(72) Inventors: Carl Geoffrion, Saint-Jean-sur-Richelieu (CA); Robert Southworth, Chatsworth, CA (US); Charles Atkin, Houston, TX (US); Sanjeev Jain, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 823 days.

(21) Appl. No.: 16/023,783

(22) Filed: Jun. 29, 2018

(65) Prior Publication Data

US 2020/0007470 A1 Jan. 2, 2020

(51) Int. Cl.
*H04L 12/28* (2006.01)
*H04L 49/253* (2022.01)
(Continued)

(52) U.S. Cl.
CPC .......... *H04L 49/254* (2013.01); *H04L 47/522* (2013.01); *H04L 47/6225* (2013.01); *H04L 49/205* (2013.01)

(58) Field of Classification Search
CPC ... H04L 12/863; H04L 12/873; H04L 12/931; H04L 12/937; H04L 47/50; H04L 47/522; H04L 47/525; H04L 47/527; H04L 47/528; H04L 47/58; H04L 47/621; H04L 47/6225; H04L 47/623; H04L 47/6235; H04L 49/109; H04L 49/1546; H04L 49/205; H04L 49/254
See application file for complete search history.

(56) References Cited

U.S. PATENT DOCUMENTS

| | | | |
|---|---|---|---|
| 6,535,510 B2 * | 3/2003 | Kalkunte | H04L 47/6225 370/389 |
| 7,324,541 B2 * | 1/2008 | Muthukrishnan | H04L 49/254 370/429 |

(Continued)

OTHER PUBLICATIONS

Intel, Intel® FM2112 24-Port 10G/1G Ethernet Switch Chip Data Sheet, Data Sheet, 168 pages, Apr. 2008.*

(Continued)

*Primary Examiner* — Frank Duong
(74) *Attorney, Agent, or Firm* — Compass IP Law PC (57) ABSTRACT

Technologies for adaptive network packet egress scheduling include a switch configured to configure an eligibility table for a plurality of ports of the switch, wherein the eligibility table includes a plurality of rounds. The switch is further configured to retrieve an eligible mask corresponding to a round of a plurality of rounds of the eligibility table presently being scheduled and determine a ready mask that indicates a ready status of each port. The switch is further configured to determine, for each port, whether the eligible status and the ready status indicate that port is both eligible and ready, and schedule, in response to a determination that at least one port has been determined to be both eligible and ready, each of the at least one port that has been determined to be both eligible and ready. Additional embodiments are described herein.

29 Claims, 7 Drawing Sheets

(51) Int. Cl.
*H04L 47/52* (2022.01)
*H04L 47/62* (2022.01)
*H04L 49/20* (2022.01)

(56) References Cited

U.S. PATENT DOCUMENTS

| | | | | |
|---|---|---|---|---|
| 7,792,027 | B2* | 9/2010 | Tatar | H04L 49/1546 370/252 |
| 8,730,982 | B2* | 5/2014 | Wu | H04L 47/50 370/412 |
| 10,257,117 | B2* | 4/2019 | Kumar | H04L 49/252 |
| 2004/0165598 | A1* | 8/2004 | Shrimali | H04L 49/254 370/395.42 |
| 2005/0083920 | A1* | 4/2005 | Barri | H04L 47/10 370/360 |
| 2010/0325370 | A1* | 12/2010 | Cummings | H04L 49/103 711/149 |
| 2015/0312160 | A1* | 10/2015 | Griswold | H04L 49/351 370/412 |
| 2019/0044867 | A1* | 2/2019 | Chang | H04L 45/38 |

OTHER PUBLICATIONS

Cao et al., "Per-packet load-balanced, low-latency routing for clos-based data center networks," (2013).

Dong et al., "Throughput analysis of shared-memory crosspoint buffered packet switches," (2012).

* cited by examiner

| PORT SPEED | MINIMUM BANDWIDTH ALLOCATION |
|---|---|
| 100G | 100.0G |
| 40G | 100.0G/2 = 50.0G |
| 25G | 100.0G/4 = 25.0G |
| 10G | 100.0G/8 = 12.5G |
| 1G | 100.0G/16 = 6.2G |

FIG. 4

| QUAD | PORT | FREQ | ELIGIBLE MASKS (PER ROUND) | | | | | | | | | | | | | | | |
|------|------|------|---|---|---|---|---|---|---|---|---|---|---|---|---|---|---|---|
|      |      |      | 0 | 1 | 2 | 3 | 4 | 5 | 6 | 7 | 8 | 9 | 10 | 11 | 12 | 13 | 14 | 15 |
| 0 | 0 | 100 | 1 | 1 | 1 | 1 | 1 | 1 | 1 | 1 | 1 | 1 | 1 | 1 | 1 | 1 | 1 | 1 |
| 0 | 1 | -   | X | X | X | X | X | X | X | X | X | X | X | X | X | X | X | X |
| 0 | 2 | -   | X | X | X | X | X | X | X | X | X | X | X | X | X | X | X | X |
| 0 | 3 | -   | X | X | X | X | X | X | X | X | X | X | X | X | X | X | X | X |
| 1 | 4 | 40  | 1 | 0 | 1 | 0 | 1 | 0 | 1 | 0 | 1 | 1 | 1 | 0 | 1 | 1 | 1 | 0 |
| 1 | 5 | -   | X | X | X | X | X | X | X | X | X | X | X | X | X | X | X | X |
| 1 | 6 | -   | X | X | X | X | X | X | X | X | X | X | X | X | X | X | X | X |
| 1 | 7 | -   | X | X | X | X | X | X | X | X | X | X | X | X | X | X | X | X |
| 2 | 8 | 25  | 1 | 0 | 0 | 0 | 1 | 0 | 0 | 0 | 1 | 0 | 0 | 0 | 1 | 0 | 0 | 0 |
| 2 | 9 | 25  | 0 | 1 | 0 | 0 | 0 | 1 | 0 | 0 | 0 | 1 | 0 | 0 | 0 | 1 | 0 | 0 |
| 2 | 10 | 25 | 0 | 0 | 1 | 0 | 0 | 0 | 1 | 0 | 0 | 0 | 1 | 0 | 0 | 0 | 1 | 0 |
| 2 | 11 | 25 | 0 | 0 | 0 | 1 | 0 | 0 | 0 | 1 | 0 | 0 | 0 | 1 | 0 | 0 | 0 | 1 |
| 2 | 12 | 10 | 0 | 0 | 0 | 0 | 0 | 0 | 0 | 0 | 1 | 0 | 0 | 0 | 0 | 0 | 0 | 0 |
| 2 | 13 | 10 | 0 | 0 | 0 | 0 | 0 | 0 | 0 | 0 | 0 | 1 | 0 | 0 | 0 | 0 | 0 | 0 |
| 2 | 14 | 10 | 0 | 0 | 0 | 0 | 0 | 0 | 0 | 0 | 0 | 0 | 1 | 0 | 0 | 0 | 0 | 0 |
| 2 | 15 | 10 | 0 | 0 | 0 | 0 | 0 | 0 | 0 | 0 | 0 | 0 | 0 | 1 | 0 | 0 | 0 | 0 |
| ... | ... | ... | ... | ... | ... | ... | ... | ... | ... | ... | ... | ... | ... | ... | ... | ... | ... | ... |
| 6 | 24 | 25  | 1 | 0 | 0 | 0 | 0 | 0 | 0 | 0 | 1 | 0 | 0 | 0 | 1 | 0 | 0 | 0 |
| 6 | 25 | 10  | 0 | 1 | 0 | 0 | 0 | 0 | 0 | 0 | 0 | 1 | 0 | 0 | 0 | 0 | 0 | 0 |
| 6 | 26 | 2.5 | 0 | 0 | 0 | 0 | 0 | 0 | 0 | 0 | 0 | 0 | 0 | 0 | 0 | 1 | 0 | 0 |
| 6 | 27 | 1   | 0 | 0 | 0 | 0 | 0 | 0 | 1 | 0 | 0 | 0 | 0 | 0 | 0 | 0 | 0 | 0 |

TECHNOLOGIES FOR ADAPTIVE NETWORK PACKET EGRESS SCHEDULING

BACKGROUND

Modern computing devices have become ubiquitous tools for personal, business, and social uses. As such, many modern computing devices are capable of connecting to various data networks, including the Internet, to transmit and receive data communications over the various data networks at varying rates of speed. To facilitate communications between computing devices, the data networks typically include one or more network compute devices (e.g., via switches, routers, etc.) to route network traffic that enters/exits the network (e.g., north-south network traffic) and between computing devices (e.g., compute servers, storage servers, etc.) in the network (e.g., east-west network traffic).

Such network traffic routing capable network compute devices generally rely on a scheduler (i.e., a network scheduler, a packet scheduler, etc.) of a switch to determine the order in which ports of the switch are serviced, both on ingress and egress. Typically, the scheduler is configured to arbitrate between a collection of ports, and their associated transmit and receive queues, which may be operating at very different speeds (e.g., 100 G versus 1 G), and also operate efficiently when handling different network packet sizes and network traffic patterns. Oftentimes, the scheduler is also required to maintain certain service levels (e.g., maximum service levels in accordance with a service level agreement (SLA)) in order to match the line rate of each port and avoid overrun/underrun.

It should be appreciated that network packets are normally broken up into chunks when passing through a switch's fabric and packet processing pipeline, and typically the chunk size is larger than the minimum Ethernet packet size. Consequently, it should be further appreciated that it takes more frequent scheduler cycles to service a sequence of small packets than it does to service larger packets that can make better use of the full chunk size. Accordingly, a scheduler and switch fabric that are fully provisioned for minimum sized packets on all ports would need to operate at relatively higher throughput, could result in higher clock frequencies, multiple pipelines, higher power and other design difficulties, depending on the implementation.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
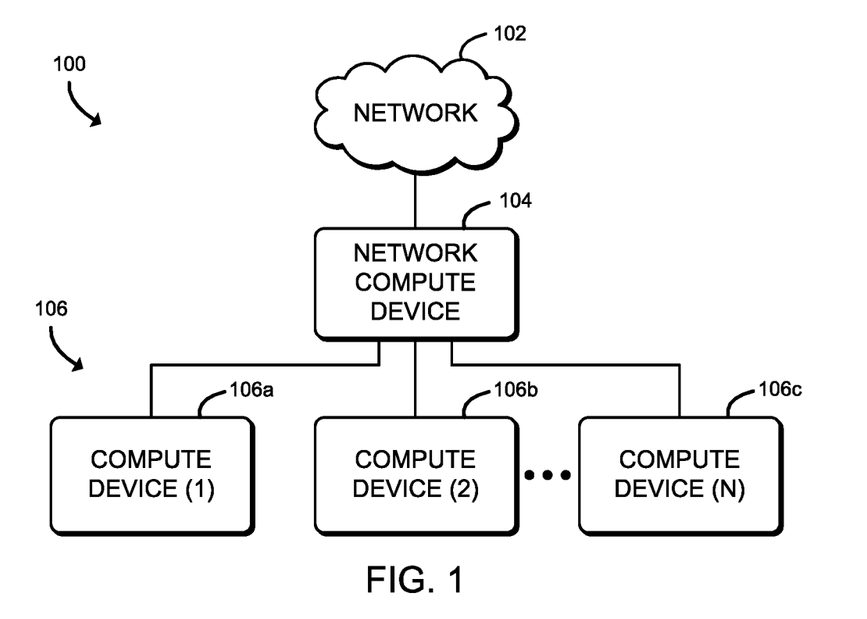
FIG. 1 is a simplified block diagram of at least one embodiment of a system for adaptive network packet egress scheduling that includes a network compute device communicatively coupled to multiple compute devices.

Referring now to FIG. 1, in an illustrative embodiment, a system 100 for adaptive network packet egress scheduling includes a network compute device 104 communicatively coupled to multiple compute devices 106 (e.g., in a cloud environment, a data center, etc.). The network compute device 104 is configured to receive network packets originating outside of the network 102, commonly referred to as north-south network traffic. The network compute device 104 is additionally configured to route traffic to other compute devices 106, which may be directly coupled to the network compute device 104 or indirectly coupled via another network compute device 104, commonly referred to as east-west network traffic. As shown in the illustrative system 100, the compute devices 106 include a first compute device 106 designated as compute device (1) 106a, a second compute device 106 designated as compute device (2) 106b, and a third compute device 106 designated as compute device (N) 106c (e.g., in which the compute device (N) 106b represents the "Nth" compute device 106 and "N" is a positive integer). It should be appreciated that while only a single network compute device 104 is illustratively shown, multiple network compute devices 104 may be employed in other embodiments.

In use, the network compute device 104 services egress ports of a switch of the network compute device 104 based on an adaptive network packet transmission schedule (see, e.g., the eligibility table 500 of FIG. 5) that is configured to optimize the scheduling sequence to favor more utilized ports and not cause a port to receive less bandwidth than a minimum level that the port is configured to receive. Based on the adaptive network packet transmission schedule, the network compute device 104 can shift bandwidth from less utilized ports to more utilized ports, such that an under-provisioned port can handle shorter packets when the total fabric bandwidth allows. As such, unlike present techniques, such as those techniques which step through a configurable fixed sequence of port numbers (i.e., fixed-sequence schedulers), in which the frequency of servicing a given port is set to the minimum packet size rate for each port's operating bandwidth, the network compute device 104 can use the adaptive network packet transmission schedule to increase the number of ports that can be serviced for a given amount of fabric bandwidth.

To do so, as will be described in further detail below, the network compute device 104 is configured to populate multiple rounds of the adaptive network packet transmission schedule as a function of a minimum bandwidth allocation and a minimal service rate determined for each port. The network compute device 104 is additionally configured to, for each round of the adaptive network packet transmission schedule, determine which ports are to be serviced during a particular round. To do so, the network compute device 104 is configured to retrieve an eligible mask (see, e.g., the eligible mask 602 of FIG. 6) that corresponds to the present round of the adaptive network packet transmission schedule being used and identify a ready mask that indicates which ports have a network packet waiting to be scheduled (i.e., which ports are in a ready state). Accordingly, the network compute device 104 can determine which ports are eligible and ready to be scheduled (i.e., which ports are in a pending state) based on a result of a comparison of the eligible mask and the ready mask. In other words, a port that is eligible in a given round being scheduled which is also ready to send a packet waiting to be scheduled, and the port is not paused, will be scheduled during that given round.

The network compute device 104 may be embodied as any type of computing device having multiple egress ports, such as a switch, a router, server, etc. The network compute device 104 of the system 100 as illustratively shown may be embodied as any type of switch, such as a disaggregated switch, a rack-mounted switch, a standalone switch, a fully managed switch, a partially managed switch, a full-duplex switch, and/or a half-duplex communication mode enabled switch. The network compute device 104 may be positioned as a top-of-rack (ToR) switch, an end-or-rack (EoR) switch, a middle-of-rack (MoR) switch, or any position in which the network compute device 104 may be configured to perform the functions described herein. For example, in some embodiments, the network compute device 104 may be configured as a managed smart switch that includes a set of management features, such as may be required for the network compute device 104 to perform the functions as described herein. As noted previously, it should be appreciated that the adaptive network packet transmission schedule and associated operations performed thereon, as described herein, may be employed by any type of computing device having multiple egress ports capable performing such network packet scheduling logic as described herein.

Figure 2:
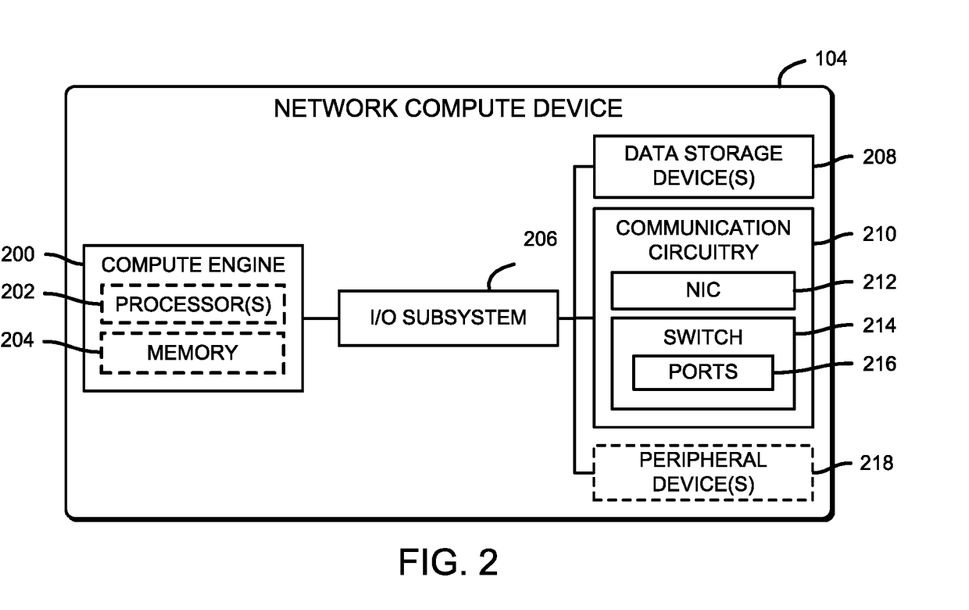
FIG. 2 is a simplified block diagram of at least one embodiment of the network compute device of the system of FIG. 1.

Referring now to FIG. 2, the illustrative network compute device 104 includes a compute engine 200, an I/O subsystem 206, one or more data storage devices 208, communication circuitry 210, and, in some embodiments, one or more peripheral devices 218. It should be appreciated that the network compute device 104 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component.

The compute engine 200 may be embodied as any type of device or collection of devices capable of performing the various compute functions as described herein. In some embodiments, the compute engine 200 may be embodied as a single device such as an integrated circuit, an embedded system, a field-programmable-array (FPGA), a system-on-a-chip (SOC), an application specific integrated circuit (ASIC), reconfigurable hardware or hardware circuitry, or other specialized hardware to facilitate performance of the functions described herein. Additionally, in some embodiments, the compute engine 200 may include, or may be embodied as, one or more processors 202 (i.e., one or more central processing units (CPUs)) and memory 204.

The processor(s) 202 may be embodied as any type of processor capable of performing the functions described herein. For example, the processor(s) 202 may be embodied as one or more single-core processors, multi-core processors, digital signal processors (DSPs), microcontrollers, or other processor(s) or processing/controlling circuit(s). In some embodiments, the processor(s) 202 may be embodied as, include, or otherwise be coupled to a field programmable gate array (FPGA), an application specific integrated circuit (ASIC), reconfigurable hardware or hardware circuitry, or other specialized hardware to facilitate performance of the functions described herein.

The memory 204 may be embodied as any type of volatile or non-volatile memory, or data storage capable of performing the functions described herein. It should be appreciated that the memory 204 may include main memory (i.e., a primary memory) and/or cache memory (i.e., memory that can be accessed more quickly than the main memory). It should be further appreciated that the volatile memory may be a storage medium that requires power to maintain the state of data stored by the medium. Non-limiting examples of volatile memory may include various types of random access memory (RAM), such as dynamic random access memory (DRAM) or static random access memory (SRAM).

The compute engine 200 is communicatively coupled to other components of the network compute device 104 via the I/O subsystem 206, which may be embodied as circuitry and/or components to facilitate input/output operations with the processor 202, the memory 204, and other components of the network compute device 104. For example, the I/O subsystem 206 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 206 may form a portion of a system-on-a-chip (SoC) and be incorporated, along with one or more of the processor 202, the memory 204, and other components of the network compute device 104, on a single integrated circuit chip.

The one or more data storage devices 208 may be embodied as any type of storage device(s) configured for short-term or long-term storage of data, such as, for example, memory devices and circuits, memory cards, hard disk drives, solid-state drives, or other data storage devices. Each data storage device 208 may include a system partition that stores data and firmware code for the data storage device 208. Each data storage device 208 may also include an operating system partition that stores data files and executables for an operating system.

The communication circuitry 210 may be embodied as any communication circuit, device, or collection thereof, capable of enabling communications between the network compute device 104 and the compute devices 106, as well as any network communication enabling devices, such as an access point, router, etc., to allow communication to/from the network compute device 104. Accordingly, the communication circuitry 210 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication. It should be appreciated that, in some embodiments, the communication circuitry 210 may include specialized circuitry, hardware, or combination thereof to perform pipeline logic (e.g., hardware-based algorithms) for performing the functions described herein, including processing network packets, making routing decisions, performing computational functions, etc.

In some embodiments, performance of one or more of the functions of communication circuitry 210 as described herein may be performed by specialized circuitry, hardware, or combination thereof of the communication circuitry 210, which may be embodied as a system-on-a-chip (SoC) or otherwise form a portion of a SoC of the network compute device 104 (e.g., incorporated on a single integrated circuit chip along with a processor 202, the memory 204, and/or other components of the network compute device 104). Alternatively, in some embodiments, the specialized circuitry, hardware, or combination thereof may be embodied as one or more discrete processing units of the network compute device 104, each of which may be capable of performing one or more of the functions described herein.

The illustrative communication circuitry 210 includes a network interface controller (NIC) 212, also commonly referred to as a host fabric interface (HFI) in some embodiments (e.g., high-performance computing (HPC) environments), and a switch 214. The NIC 212 may be embodied as one or more add-in-boards, daughtercards, network interface cards, controller chips, chipsets, or other devices that may be used by the network compute device 104. In some embodiments, the NIC 212 may be embodied as part of a system-on-a-chip (SoC) that includes one or more processors, or included on a multichip package that also contains one or more processors. In some embodiments, the NIC 212 may include other components which are not shown for clarity of the description, such as a processor, an accelerator device (e.g., any type of specialized hardware on which operations can be performed faster and/or more efficiently than is possible on the local general-purpose processor), and/or memory. It should be appreciated that, in such embodiments, the local processor and/or accelerator device of the NIC 212 may be capable of performing one or more of the functions described herein.

The illustrative switch 214 includes multiple ports 216 (i.e., input/output ports), each of which may be embodied as any type of network port capable of performing the functions described herein, including transmitting and receiving data to/from the network compute device 104. Accordingly, in some embodiments, the network compute device 104 may be configured to create a separate collision domain for each of the ports 216. As such, depending on the network design of the network compute device 104 and the operation mode (e.g., half-duplex, full-duplex, etc.), it should be appreciated that each of the compute devices 106 connected to one of the ports 216 of the network compute device 104 may be configured to transfer data to any of the other compute devices 106 at any given time, and the transmissions should not interfere or collide.

The one or more peripheral devices 218 may include any type of device that is usable to input information into the network compute device 104 and/or receive information from the network compute device 104. The peripheral devices 218 may be embodied as any auxiliary device usable to input information into the network compute device 104, such as a keyboard, a mouse, a microphone, a barcode reader, an image scanner, etc., or output information from the network compute device 104, such as a display, a speaker, graphics circuitry, a printer, a projector, etc. It should be appreciated that, in some embodiments, one or more of the peripheral devices 218 may function as both an input device and an output device (e.g., a touchscreen display, a digitizer on top of a display screen, etc.). It should be further appreciated that the types of peripheral devices 218 connected to the network compute device 104 may depend on, for example, the type and/or intended use of the network compute device 104. Additionally or alternatively, in some embodiments, the peripheral devices 218 may include one or more ports, such as a USB port, for example, for connecting external peripheral devices to the network compute device 104.

Referring back to FIG. 1, the compute devices 106 may be embodied as any type of computation or computer device capable of performing the functions described herein, including, without limitation, a server (including, e.g., stand-alone server, rack-mounted server, blade server, etc.), a sled (e.g., a compute sled, an accelerator sled, a storage sled, a memory sled, etc.), an enhanced NIC (e.g., a host fabric interface (HFI)), a distributed computing system, or any other combination of compute/storage device(s) capable of performing the functions described herein. It should be appreciated that each of the compute devices 106 typically includes similar and/or like components to that of the illustrative network compute device 104 described above.

As such, the descriptions of the like components are not repeated herein for clarity of the description with the understanding that the description of the corresponding components provided above in regard to the network compute device 104 applies equally to the corresponding components of the compute devices 106. Of course, it should be appreciated that the compute devices 106 may include additional and/or alternative components, depending on the embodiment.

The network 102 may be embodied as any type of wired or wireless communication network, including but not limited to a wireless local area network (WLAN), a wireless personal area network (WPAN), an edge network (e.g., a multi-access edge computing (MEC) network), a fog network, a cellular network (e.g., Global System for Mobile Communications (GSM), Long-Term Evolution (LTE), 5G, etc.), a telephony network, a digital subscriber line (DSL) network, a cable network, a local area network (LAN), a wide area network (WAN), a global network (e.g., the Internet), or any combination thereof. It should be appreciated that, in such embodiments, the network 102 may serve as a centralized network and, in some embodiments, may be communicatively coupled to another network (e.g., the Internet). Accordingly, the network 102 may include a variety of other virtual and/or physical computing devices (e.g., routers, switches, network hubs, servers, storage devices, compute devices, etc.), as needed to facilitate the transmission of network traffic through the network 102.

Figure 3:
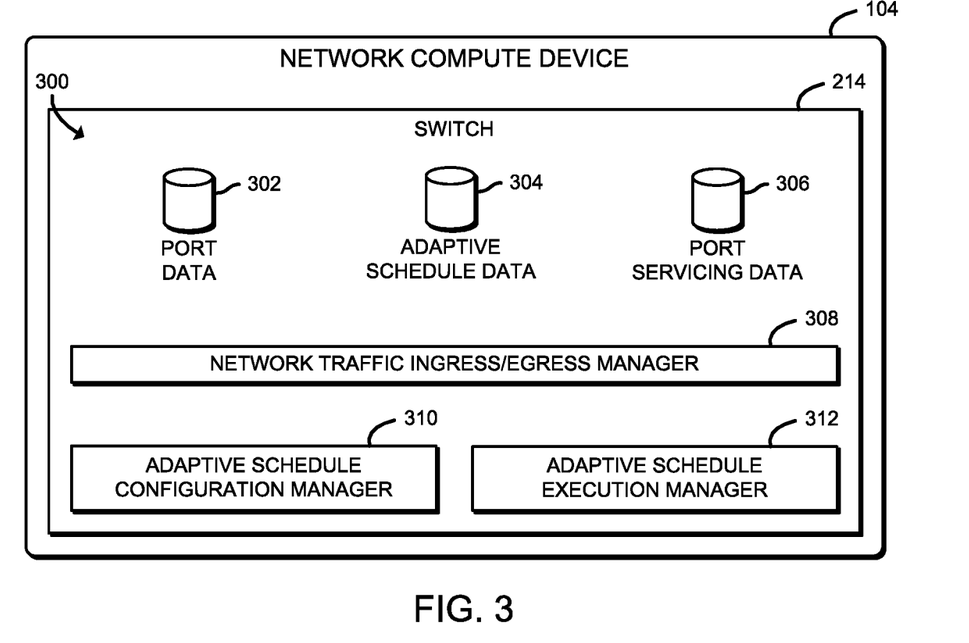
FIG. 3 is a simplified block diagram of at least one embodiment of an environment of the network compute device of FIGS. 1 and 2.

Referring now to FIG. 3, in use, the network compute device 104 establishes an environment 300 during operation. The illustrative environment 300 includes a network traffic ingress/egress manager 308, an adaptive network packet transmission schedule configuration manager 310, and an adaptive network packet transmission schedule execution manager 312. The various components of the environment 300 may be embodied as hardware, firmware, software, or a combination thereof. As such, in some embodiments, one or more of the components of the environment 300 may be embodied as circuitry or collection of electrical devices (e.g., network traffic ingress/egress management circuitry 308, adaptive network packet transmission schedule configuration management circuitry 310, adaptive network packet transmission schedule execution management circuitry 312, etc.).

It should be appreciated that, in such embodiments, one or more of the network traffic ingress/egress management circuitry 308, the adaptive network packet transmission schedule configuration management circuitry 310, and the adaptive network packet transmission schedule execution management circuitry 312 may form a portion of the communication circuitry 210, or more particularly the switch 214, as illustratively shown. It should be further appreciated that, in other embodiments, one or more functions described herein as being performed by the switch 214 may be performed, at least in part, by one or more other components of the network compute device 104, such as compute engine 200, the I/O subsystem 206, the NIC 212, etc. Additionally, in some embodiments, one or more of the illustrative components may form a portion of another component and/or one or more of the illustrative components may be independent of one another. Further, in some embodiments, one or more of the components of the environment 300 may be embodied as virtualized hardware components or emulated architecture, which may be established and maintained by the compute engine 200 or other components of the network compute device 104. It should be appreciated that the network compute device 104 may include other components, sub-components, modules, sub-modules, logic, sub-logic, and/or devices commonly found in a computing device, which are not illustrated in FIG. 3 for clarity of the description.

In the illustrative environment 300, the network compute device 104 additionally includes port data 302, adaptive network packet transmission schedule data 304, and port servicing data 306, each of which may be accessed by the various components and/or sub-components of the network compute device 104. Additionally, it should be appreciated that in some embodiments the data stored in, or otherwise represented by, each of the port data 302, the adaptive network packet transmission schedule data 304, and the port servicing data 306 may not be mutually exclusive relative to each other. For example, in some implementations, data stored in the port data 302 may also be stored as a portion of one or more of the adaptive network packet transmission schedule data 304 and/or the port servicing data 306. As such, although the various data utilized by the network compute device 104 is described herein as particular discrete data, such data may be combined, aggregated, and/or otherwise form portions of a single or multiple data sets, including duplicative copies, in other embodiments.

The network traffic ingress/egress manager 308, which may be embodied as hardware, firmware, software, virtualized hardware, emulated architecture, and/or a combination thereof as discussed above, is configured to receive inbound and route/transmit outbound network traffic. To do so, the network traffic ingress/egress manager 308 is configured to facilitate inbound/outbound network communications (e.g., network traffic, network packets, network flows, etc.) to and from the network compute device 104. For example, the network traffic ingress/egress manager 308 is configured to manage (e.g., create, modify, delete, etc.) connections to physical ports (e.g., the ports 216 of the switch 214 of FIG. 2) and virtual network ports (i.e., virtual network interfaces) of the network compute device 104, as well as the ingress/egress buffers/queues associated therewith.

The adaptive network packet transmission schedule configuration manager 310, which may be embodied as hardware, firmware, software, virtualized hardware, emulated architecture, and/or a combination thereof as discussed above, is configured to manage the configuration of the adaptive network packet transmission schedule. To do so, the adaptive network packet transmission schedule configuration manager 310 is configured to perform an analysis on each port to determine a minimal service rate (i.e., a representation of the average rate at which a port must be serviced, measured in clock cycles) for each port. For example, the adaptive network packet transmission schedule configuration manager 310 may be configured to walk each of the active ports and compute a required service rate for each port. In furtherance of the example, the adaptive network packet transmission schedule configuration manager 310 may be additionally configured to find the lowest service rate which is usable by the adaptive network packet transmission schedule configuration manager 310 to determine the maximum number of ports that can be eligible in each round.

The adaptive network packet transmission schedule configuration manager 310 is configured to take every port speed, state, and minimum average packet size to compute round configuration deterministically. It should be appreciated that going over all the possibilities may not be a viable option due to the fact that the number of possible solutions may be too great to be optimally resolved. For example, on a 24-port switch and a scheduler supporting up to 16 rounds, there are over two trillion possible solutions. As such, the adaptive network packet transmission schedule configuration manager 310 is configured to apply heuristics to converge on a solution in a more optimal manner. As such, when configuring the adaptive network packet transmission schedule, the adaptive network packet transmission schedule configuration manager 310 is configured to optimize the hardware usage to avoid wasted clock cycles, produce a deterministic configuration with predictable processing time, and minimize scheduling-related packet jitter in the switch.

The adaptive network packet transmission schedule configuration manager 310 is also configured to determine a number of rounds for the adaptive network packet transmission schedule. Additionally, the adaptive network packet transmission schedule configuration manager 310 is configured to, for each round size selected, classify each port into a speed bin based on the determined minimal service rate required for each port, wherein each speed bin is connected to the factors of the total number of rounds of the adaptive network packet transmission schedule. As such, it should be appreciated that different round sizes have different factors. For example, an adaptive network packet transmission schedule having 16 total rounds would yield five factors (i.e., 1, 2, 4, 8, and 16) that are typically well aligned with Ethernet port speed (2.5 G/10 G/40 G) or (25 G/100 G). It should be appreciated that each connected speed bin is served relative to the factors of the round. For example, in furtherance of the illustrative adaptive scheduling having 16 total rounds, speed bin 0 is served twice as often as bin 1, speed bin 1 is served twice as often as bin 2, and so on for each speed bin. In another example in which an adaptive network packet transmission schedule has 12 total rounds would result in six factors (i.e., 1, 2, 3, 4, 6, and 12), which can procure a better solution under some circumstances, e.g. a mix of 25 G/10 G. In such an example, speed bin 0 is served every round, speed bin 1 is served every 2 rounds, . . . , speed bin 4 is served every 6 rounds, and speed bin 5 is served every 12 rounds.

Additionally, based on the number of rounds and the port speed, the adaptive network packet transmission schedule configuration manager 310 is configured to ensure that the allocation of bandwidth between ports is sufficiently partitioned, such that the higher frequency ports receive more of the fabric bandwidth than the lower frequency ports, and that the relationship is maintained by the adaptive network packet transmission schedule as the network compute device 104 moves between being fully-loaded and lightly-loaded. To do so, the adaptive network packet transmission schedule configuration manager 310 is configured to populate each round of the adaptive network packet transmission schedule to generate an eligibility table (see, e.g., the eligibility table 500 of FIG. 5) based on the classified ports in each speed bin relative to the respective round being populated such that each port is allocated an amount of bandwidth that is at least equal to or greater than that required by the frequency of the port.

Figure 4:
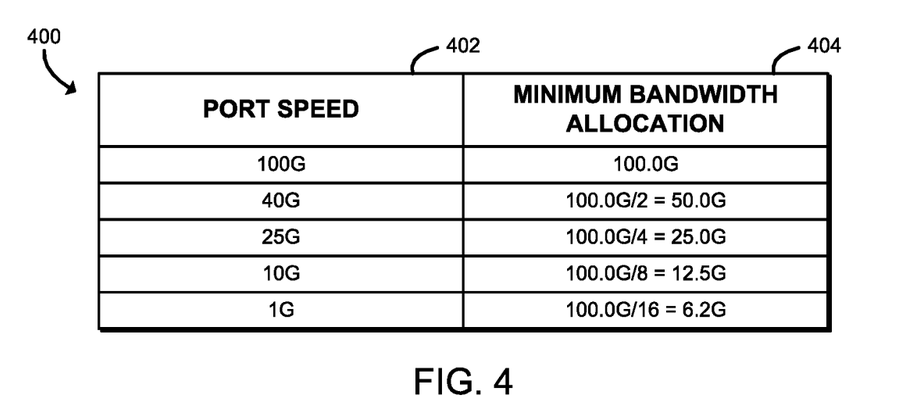
FIG. 4 is an illustrative embodiment of a minimum bandwidth allocation table.

An illustrative example is shown in FIG. 4, in which an illustrative minimum bandwidth table 400 includes a port speed column 402 and a minimum bandwidth allocation column 404. The port speed column 402 includes each supported port speed of the ports of the network compute device 104 and the minimum bandwidth allocation column 404 includes a result of a calculation of the highest supported port speed divided by a respective one of the five factors of an illustrative adaptive scheduling having 16 total rounds. As illustratively shown, each of the minimum bandwidth allocation results in the minimum bandwidth allocation column 404 are greater than the corresponding port speed in the port speed column 402, indicating the condition has been satisfied. It should be appreciated that an advantage of this partitioning scheme is simplicity when assigning ports to rounds and during reconfiguration (e.g. when 4×25 Gb ports are reconfigured to one 100 Gb port), while keeping the number of ports per round balanced.

Referring back to FIG. 3, the adaptive network packet transmission schedule configuration manager 310 may be configured to process the speed bins in ascending order (e.g., speed bin 0 first, speed bin 1 second, etc.). The adaptive network packet transmission schedule configuration manager 310 is further configured to perform any jitter reduction operations which may be necessary, such as to ensure each round of the eligibility table has the same number of eligible ports for each round. For example, the adaptive network packet transmission schedule configuration manager 310 may be configured to generate multiple adaptive network packet transmission schedules, from which the optimal solution can be chosen (e.g., based on jitter) by computing the surrounding usage and choosing the optimal solution based on one or more service rate/quality requirements (e.g., minimal jitter). Under certain conditions in which none of the generated adaptive network packet transmission schedules is a sufficient candidate for application, the adaptive network packet transmission schedule configuration manager 310 may be configured to calculate the summation of the normalized offset between the required and actual solution, and the adaptive network packet transmission schedule whose calculated result yields the minimized value may be used by the adaptive network packet transmission schedule configuration manager 310.

Figure 5:
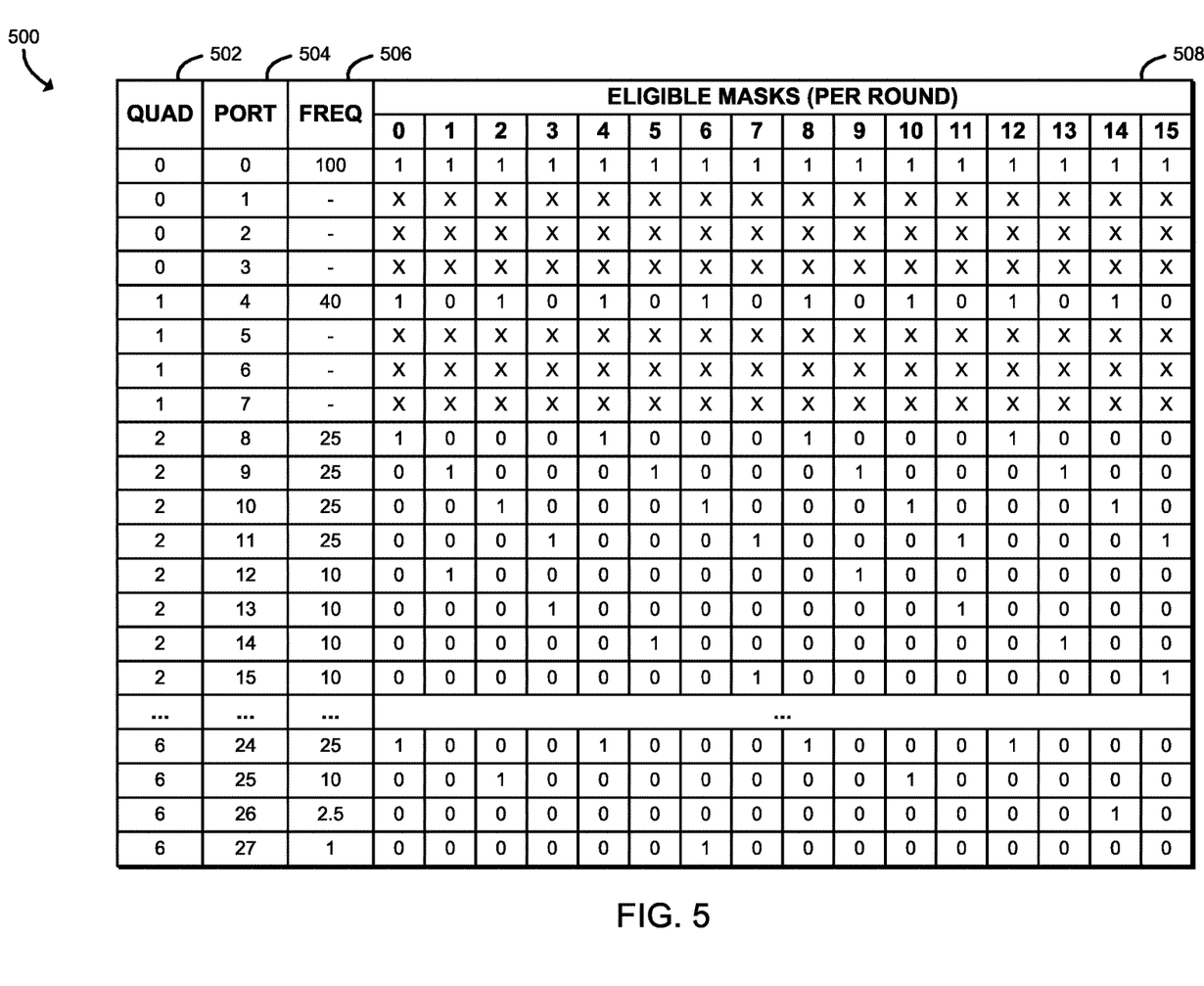
FIG. 5 is an illustrative embodiment of an eligible port servicing table.

An illustrative example of an eligibility table 500 is shown in FIG. 5. The eligibility table 500 includes a quad column 502, a port column 504, a frequency column 506, and a series of eligible masks 508. As illustratively shown, the eligibility table 500 is configured to support 28 ports (i.e., port 0 through port 27) at varying port speeds for 16 rounds (i.e., round 0 through round 15). However, it should be appreciated that, in different embodiments, the various parameters (e.g., the supported number of ports 504, rounds, quad categorization, etc.) can be increased, decreased, or otherwise adjusted for a given application.

Referring back to FIG. 3, the adaptive network packet transmission schedule configuration manager 310 is configured to populate the eligibility table 500 such that the repeat rate for any given port is faster than the minimum bandwidth requirement of that port (e.g., based on the minimum bandwidth table 400 of FIG. 4). Additionally, the adaptive network packet transmission schedule configuration manager 310 is configured to populate the eligibility table such that scheduled ports will always be spaced at least "N" cycles apart, wherein "N" is a positive integer indicating a number of cycles. As illustratively shown in FIG. 5, the number of cycles apart in the eligibility table 500 was four (i.e., "N"=4), and any ports serviced in violation of the required spacing can result in a spacing violation. As also illustratively shown, if a port is in quad lane mode, which may be needed for port speeds greater than 25 Gb, then only port 0 should be configured (i.e., port % 4==0) port should be configured. In other words, ports 1, 2, and 3 cannot be used. Referring again back to FIG. 3, the adaptive network packet transmission schedule configuration manager 310 is further configured to populate the eligibility table such that the scheduled quads will always be spaced at a programmable "M" clock cycles apart, wherein "M" is a positive integer indicating a number of clock cycles.

The adaptive network packet transmission schedule execution manager 312, which may be embodied as hardware, firmware, software, virtualized hardware, emulated architecture, and/or a combination thereof as discussed above, is configured to manage the adaptive scheduling during operation. To do so, the adaptive network packet transmission schedule execution manager 312 is configured to service each eligible port (e.g., in one clock cycle) based on the eligibility status of each port during the round being scheduled. Accordingly, the adaptive network packet transmission schedule execution manager 312 is configured to retrieve an eligible mask from the eligibility table 500 (e.g., configured by the adaptive network packet transmission schedule configuration manager 310) and determine a ready mask which indicates which ports are presently available for servicing (i.e., have a network packet available for transmission). The adaptive network packet transmission schedule execution manager 312 is additionally configured to compare the eligible mask with the ready mask to identify which ports are pending (i.e., both eligible and ready) during the given round being scheduled. It should be appreciated that each of the eligible mask and ready mask are comprised of a series of bits in which each bit corresponds to a respective one of the ports of the table 500. Accordingly, it should be appreciated that each index of the respective bit masks corresponds to a port, such that when the eligible mask and ready mask are compared, the respective ports to which the bits correspond are aligned. In other words, bit 0 of the eligible mask and bit 0 of the ready mask both correspond to port 0, bit 1 of the eligible mask and bit 1 of the ready mask both correspond to port 1, and so on.

Figure 6:
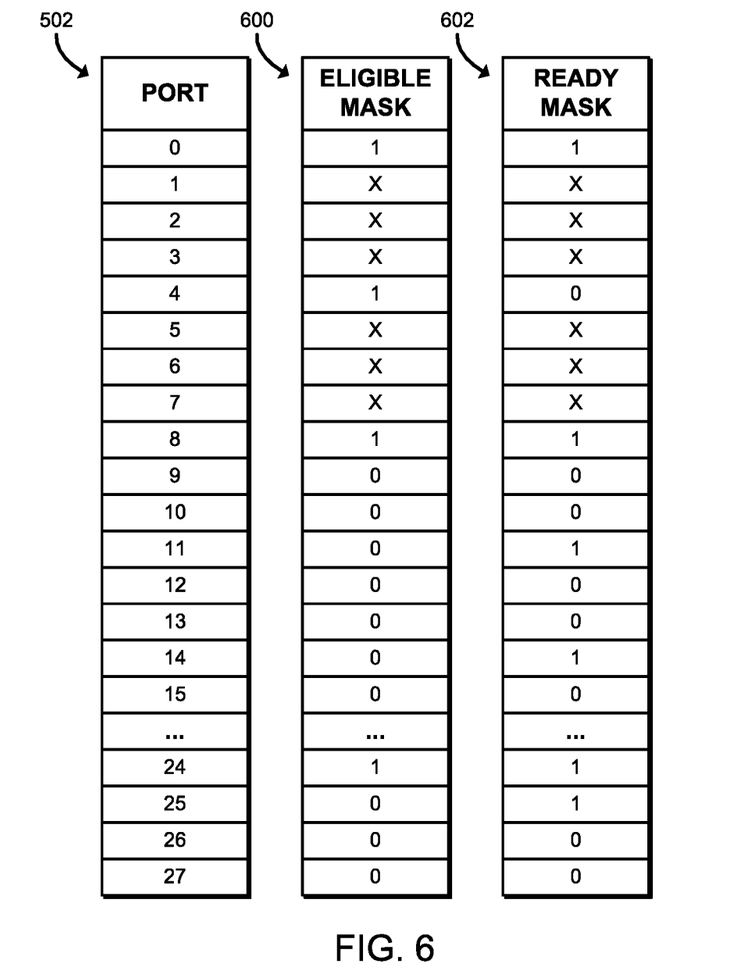
FIG. 6 is an illustrative embodiment of an eligible mask of the port servicing table of FIG. 5 and a ready mask usable to identify which ports are to be serviced during a given round of an adaptive network packet transmission schedule.

Referring now to FIG. 6, an illustrative eligible mask 600 and an illustrative ready mask 602 for a given round are shown. As described previously, the eligible mask 600 indicates whether a given port is eligible for scheduling during a particular round, and the ready mask 602 indicates whether a given port has a network packet available for servicing at a given time. As illustratively shown, the eligible mask 600 corresponds to the first (i.e., zeroth indexed) round of the eligible masks 508 of FIG. 5. As such, each row of the eligible mask 600 corresponds to a given port, with an eligible status of "1" indicating that the port is eligible, an eligible status "0" indicating the port is not eligible, and an eligible status "X" indicating the port is not being serviced (i.e., based on the port speed/frequency). Each row of the ready mask 602 similarly maps to a given port, with a ready status of "1" indicating that the port is ready (i.e., a network packet is available for servicing at that port), a ready of "0" indicating the port is not ready (i.e., a network packet is not available for servicing at that port), and a ready "X" indicating the port is not being serviced.

For example, port 0 is both eligible and ready (i.e., the eligible status and the ready status are both set to "1"), indicating that port 0 is pending and should be scheduled for servicing. In another example, port 4 is eligible but not ready (i.e., the eligible status is set to "1" and the ready status is set to "0"); thereby indicating that port 4 is not pending and should not be scheduled for servicing. In still another example, port 14 is not eligible but is ready; thereby indicating that, while ready, port 14 is not pending (i.e., the eligible status is set to "0" and the ready status is set to "1"), and therefore, should not be scheduled for servicing.

Referring back to FIG. 3, after detecting that at least one of the eligible ports is ready (i.e., at least one port is pending) in the presently scheduled round, the adaptive network packet transmission schedule execution manager 312 is additionally configured to select the lowest numbered pending port that does not create a spacing violation. The adaptive network packet transmission schedule execution manager 312 is further configured to schedule the selected pending port for servicing. Accordingly, it should be appreciated that, in some embodiments, at least a portion of the adaptive network packet transmission schedule execution manager 312 may form a portion of or otherwise have access to resources (e.g., egress buffers/queues) of the network traffic ingress/egress manager 308.

The adaptive network packet transmission schedule execution manager 312 is configured to introduce a skip (e.g., an idle cycle) if there are pending ports, but none of the pending ports can be scheduled for service without creating a spacing violation. In some embodiments, the adaptive network packet transmission schedule execution manager 312 may be configured to implement an optional skip-filling mechanism which could allow ready ports that are not eligible to go in the skip (i.e., skip-fill). In such embodiments, an ineligible port may skip-fill on a skip cycle, if the ineligible port is configured to allow skip-filling, the port is ready and no other port in the same quad is eligible, and a spacing violation would be created. Further, in such embodiments, skip-filling may be performed in a round-robin order by port number, for example.

Figure 7A:
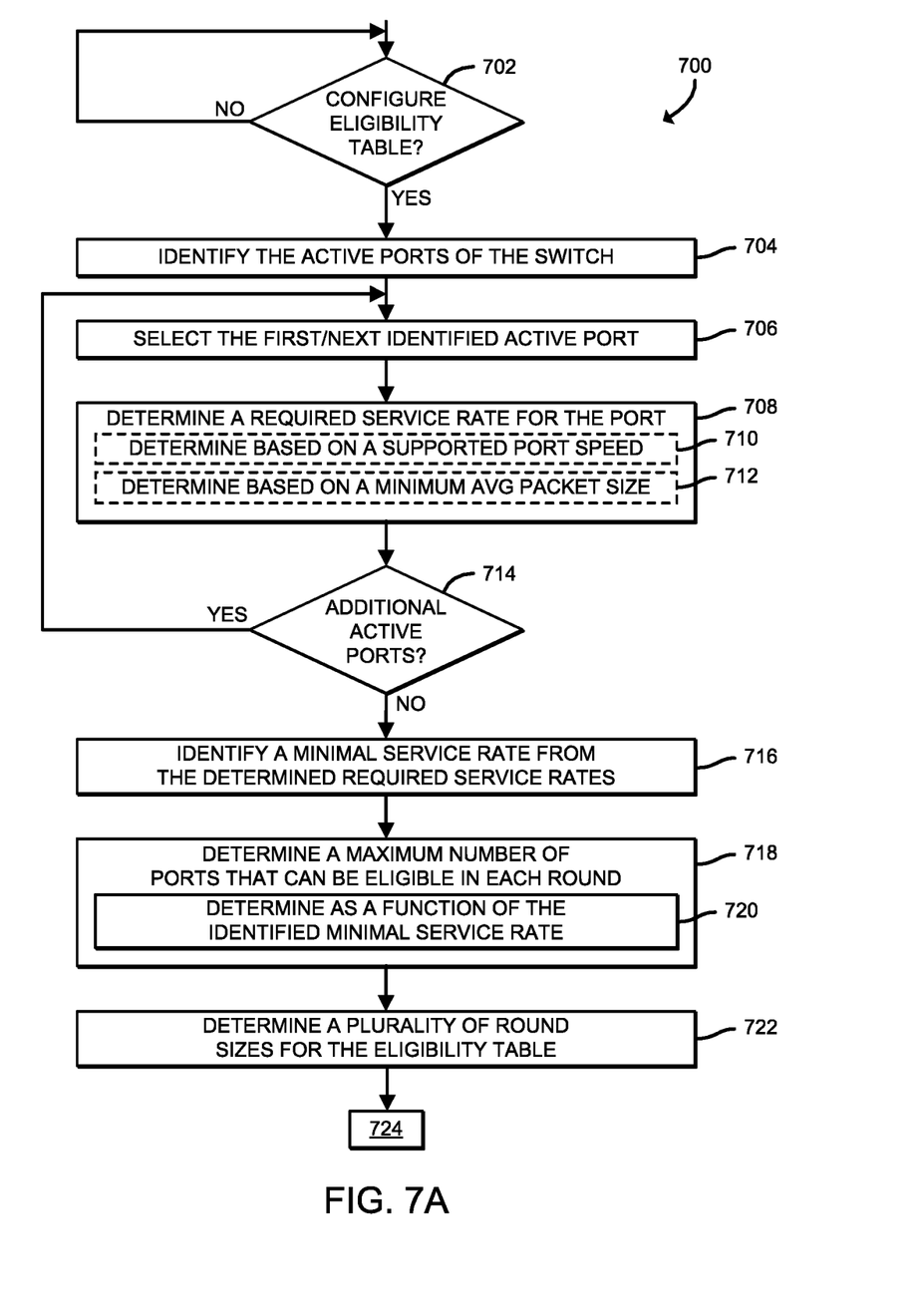
FIGS. 7A and 7B are a simplified flow diagram of at least one embodiment of a method for configuring an adaptive network packet transmission schedule that may be executed by the network compute device of FIGS. 1-3.
Figure 7B:
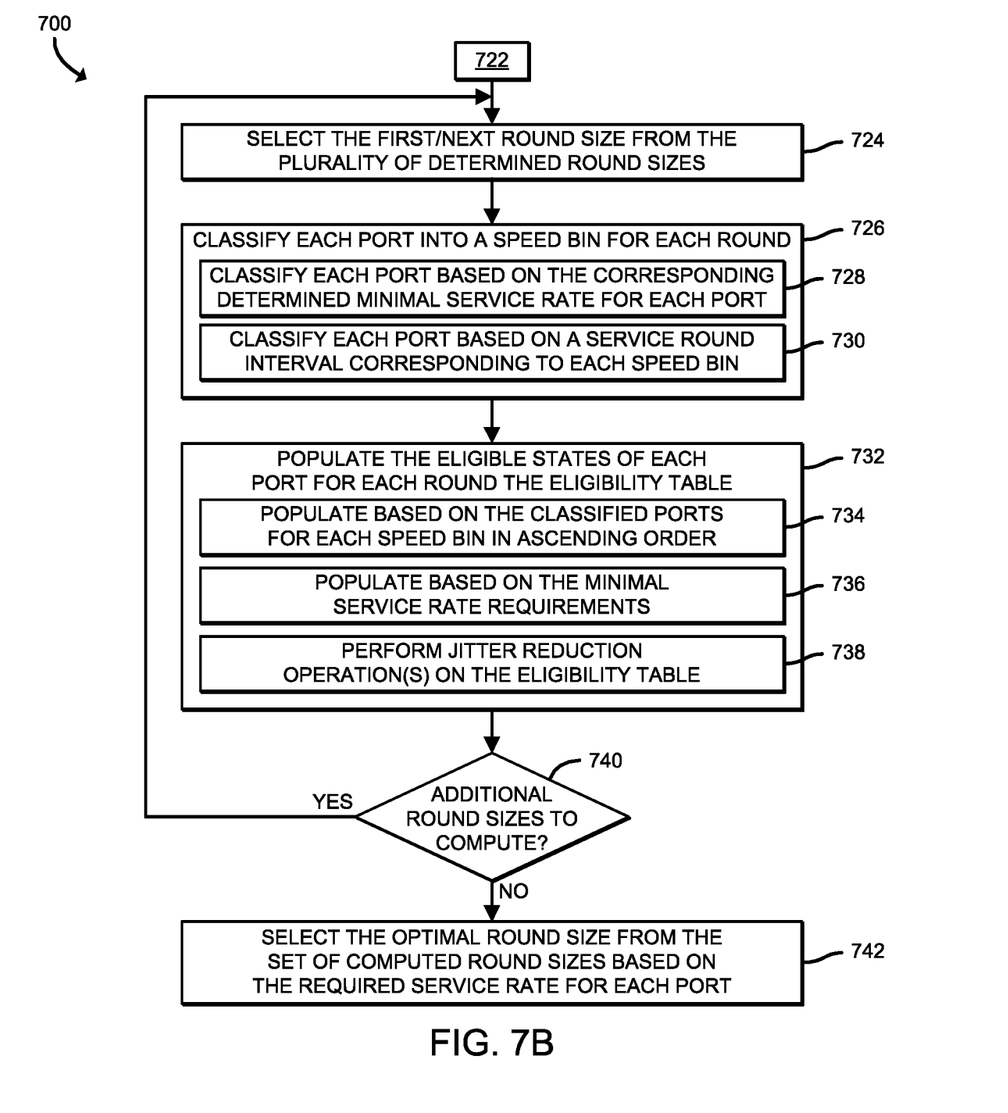

Referring now to FIGS. 7A and 7B, a method 700 for configuring an adaptive network packet transmission schedule (i.e., an eligibility table) is shown which may be executed by the network compute device 104, or more particularly by one or more components of the switch as described herein in FIGS. 2 and 3, such as the switch 214 as illustratively shown in FIG. 3. The method 700 begins with block 702, in which the network compute device 104 determines whether to configure an eligibility table for adaptively scheduling network packet transmissions. It should be appreciated that the method 700 may be triggered after initial configuration in the event of one or more of a detected port speed change, port state change, or average packet size change, for example.

If the eligibility table is to be configured, the method 700 advances to block 704, in which the network compute device 104 identifies the active ports of the switch 214. In block 706, the network compute device 104 selects the first identified active port. In block 708, the network compute device 104 determines a required service rate for that port. To do so, in block 710, the network compute device 104 may determine the required service rate based on a port speed for the port and/or, in block 712, based on a minimum average packet size. In block 714, the network compute device 104 determines whether the required service rate needs to be determined for any additional active ports. If so, the method 700 returns to block 706, in which the network compute device 104 selects the next identified active port for determining the required service rate for that port. Otherwise, if the required service rate has been determined for all of the active ports, the method 700 advances to block 716.

In block 716, the network compute device 104 identifies the minimal service rate (i.e., the lowest of the required service rates determined for each active port) for which the maximum number of ports can be eligible each round. In block 718, the network compute device 104 determines a maximum number of ports that can be eligible in each round. To do so, in block 720, the network compute device 104 determines the maximum number of ports as a function of the identified minimal service rate. In block 722, the network compute device 104 determines a plurality of round sizes (e.g., 12 rounds, 16 rounds, 20 rounds, etc.). As described previously, it should be appreciated that different round sizes have different factors (e.g., a round size of 16 rounds would yield five factors: 1, 2, 4, 8, and 16).

In block 724 of FIG. 7B, the network compute device 104 selects the first round size from the plurality of determined round sizes. In block 726, the network compute device 104 classifies each port into a speed bin for each round. To do so, in block 728, the network compute device 104 classifies each port based on the corresponding determined minimal service rate for each port. Additionally, in block 730, the network compute device 104 classifies each port based on a service round interval corresponding to each speed bin.

In block 732, the network compute device 104 populates the eligible state of each port for each round of the eligibility table (see, e.g., the illustrative eligibility table 500 of FIG. 500). To do so, in block 734, the network compute device 104 populates each round based on the classified ports for each speed bin in ascending order (e.g., speed bin 0 first, speed bin 1 second, etc.). Additionally, in block 736, the network compute device 104 populates each round based on the minimal service rate requirements for each port. Further, in block 738, the network compute device 104 performs one or more jitter reduction operations on the eligibility table. As described previously, a jitter reduction operation may be performed to ensure that each round has generally the same number of eligible ports.

In block 740, the network compute device 104 determines whether there are any additional round sizes to compute. If so, the method 700 returns to block 724, in which the network compute device 104 selects the next round size from the plurality of determined round sizes to classify and populate the eligible states of each port for each round. Otherwise, if the network compute device 104 determines that all of the round sizes have been computed, the method 700 advances to block 742. In block 742, the network compute device 104 selects the optimal round size from the set of computed round sizes based on the required service rate for each port.

Figure 8:
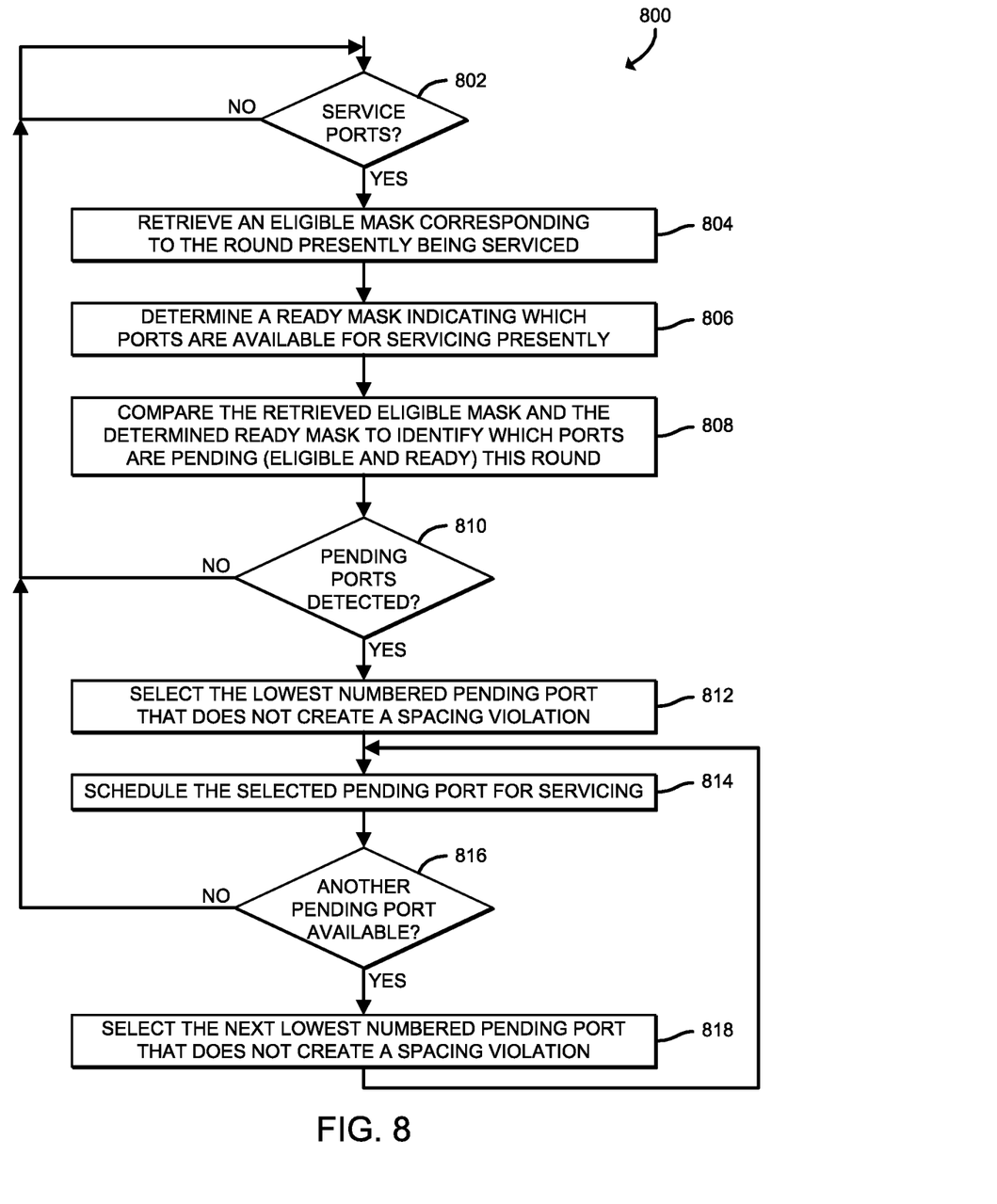
FIG. 8 is a simplified flow diagram of at least one embodiment of a method for servicing ports based on an adaptive network packet transmission schedule that may be executed by the network compute device of FIGS. 1-3.

Referring now to FIG. 8, a method 800 for servicing ports based on an adaptive network packet transmission schedule (i.e., a previously configured eligibility table) is shown which may be executed by the network compute device 104, or more particularly by one or more components of the switch as described herein in FIGS. 2 and 3, such as the switch 214 as illustratively shown in FIG. 3. The method 800 begins with block 802, in which the network compute device 104 determines whether the ports of the switch (e.g., the ports 216 of the switch 214 of FIG. 2) are to be serviced. If so, the method 800 advances to block 804. In block 804, the network compute device 104 retrieves an eligible mask corresponding to the round presently being serviced from the previously configured eligibility table. In block 806, the network compute device 104 determines a ready mask indicating which ports are available for servicing (i.e., which ports have a network packet presently ready for servicing).

In block 808, the network compute device 104 compares the retrieved eligible mask and the determined ready mask to identify which ports are pending (i.e., which ports are both eligible and ready) for the round being serviced. In block 810, the network compute device 104 determines whether any pending ports have been detected as a result of the comparison. If not, the method 800 returns to block 802, in which the network compute device 104 determines whether the next round is to be scheduled; otherwise, the method 800 advances to block 812. In block 812, the network compute device 104 selects the lowest numbered pending port that does not create a spacing violation. In block 814, the network compute device 104 schedules the selected pending port for servicing.

In block 816, the network compute device 104 determines whether another pending port is available. If not, the method 800 returns to block 802, in which the network compute device 104 determines whether the next round is to be scheduled; otherwise, the method 800 advances to block 818. In block 818, the network compute device 104 selects the next lowest numbered pending port that does not cause a spacing violation, after which the method 800 returns to block 814 to schedule the selected pending port for servicing. In other words, each pending port will be scheduled for service as long as doing so will not create a spacing violation and until there are no more pending ports, at which point scheduling of the round ends. In some embodiments, to simplify the implementation, if there are no pending ports at the beginning of a round, the round may consist of a single idle cycle, which can allow for a look-ahead operation to be performed.

EXAMPLES

Illustrative examples of the technologies disclosed herein are provided below. An embodiment of the technologies may include any one or more, and any combination of, the examples described below.

Example 1 includes a switch for adaptive network packet egress scheduling, the switch comprising a plurality of ports; adaptive schedule configuration management circuitry to configure an eligibility table for the plurality of ports, wherein the eligibility table includes a plurality of rounds; and adaptive schedule execution management circuitry to retrieve an eligible mask corresponding to a round of the plurality of rounds of the eligibility table presently being scheduled, wherein the eligible mask indicates an eligible status of each of the plurality of ports, and wherein the eligible status indicates whether a respective port of the eligible mask is eligible to be serviced in the round, determine a ready mask that indicates a ready status of each of the plurality of ports, wherein the ready status indicates whether a respective port of the ready mask is available to be serviced, determine, for each port, whether the eligible status and the ready status indicate that port is both eligible and ready, and schedule, in response to a determination that at least one port has been determined to be both eligible and ready, each of the at least one port that has been determined to be both eligible and ready.

Example 2 includes the subject matter of Example 1, and wherein to determine whether the eligible status and the ready status for each port indicates whether the at least one port of the plurality of ports is both eligible and ready comprises to compare, in response to a determination that the determined ready mask indicates that at least one ready port is indicated in the ready mask, the retrieved eligible mask and the determined ready mask.

Example 3 includes the subject matter of any of Examples 1 and 2, and wherein to schedule each of the at least one port that has been determined to be both eligible and ready comprises to select a lowest numbered port of the at least one port that does not create a spacing violation and schedule the selected lowest numbered port.

Example 4 includes the subject matter of any of Examples 1-3, and wherein the adaptive schedule execution management circuitry is further to skip, in response to a determination that the determined ready mask indicates that no ready ports are indicated in the ready mask, the round.

Example 5 includes the subject matter of any of Examples 1-4, and wherein to configure the eligibility table comprises to determine a minimal service rate for each of the plurality of ports; determine a total number of rounds of the eligibility table, wherein the total number of rounds comprises the plurality of rounds; determine a maximum number of eligible ports for each of the plurality of rounds; determine a plurality of speed bins as a factor of the determined total number of rounds of the eligibility table; classify each of the plurality of ports into a respective one of the plurality of speed bins; and populate an eligible state for each of the plurality of ports for each of the plurality of rounds of the eligibility table.

Example 6 includes the subject matter of any of Examples 1-5, and wherein to determine the minimal service rate for each of the plurality of ports comprises to determine the minimal service rate for each of the plurality of ports based on a port speed associated with each of the plurality of ports and a minimum average packet size.

Example 7 includes the subject matter of any of Examples 1-6, and wherein to determine the plurality of rounds for the eligibility table comprises to determine the plurality of rounds for the eligibility table based on a port speed associated with each of the plurality of ports.

Example 8 includes the subject matter of any of Examples 1-7, and wherein to determine the maximum number of eligible ports for each of the plurality of rounds comprises to (i) identify a lowest minimal service rate from the minimal service rates determined for each of the plurality of ports and (ii) determine the maximum number of eligible ports for each of the plurality of rounds based on the identified lowest minimal service rate.

Example 9 includes the subject matter of any of Examples 1-8, and wherein to classify each of the plurality of ports into a respective one of the plurality of speed bins comprise to classify each of the plurality of ports based on at least one of a corresponding minimal service rate determined for each of the plurality of ports and a service round interval corresponding to each of the plurality of speed bins.

Example 10 includes the subject matter of any of Examples 1-9, and wherein to populate the eligible state for each of the plurality of ports for each of the plurality of rounds of the eligibility table comprises to populate the eligible state based on the classification of each of the plurality of ports for each of the plurality of speed bins in ascending order.

Example 11 includes the subject matter of any of Examples 1-10, and wherein to populate the eligible state for each of the plurality of ports for each of the plurality of rounds of the eligibility table comprises to populate the eligible state based on a minimal service rate requirement.

Example 12 includes the subject matter of any of Examples 1-11, and wherein to populate the eligible state for each of the plurality of ports for each of the plurality of rounds of the eligibility table further comprises to perform a jitter reduction operation on the eligibility table.

Example 13 includes one or more machine-readable storage media comprising a plurality of instructions stored thereon that, in response to being executed, cause a switch to configure an eligibility table for a plurality of ports of the switch, wherein the eligibility table includes a plurality of rounds; retrieve an eligible mask corresponding to a round of a plurality of rounds of the eligibility table presently being scheduled, wherein the eligible mask indicates an eligible status of each of the plurality of ports, and wherein the eligible status indicates whether a respective port of the eligible mask is eligible to be serviced in the round; determine a ready mask that indicates a ready status of each of the plurality of ports, wherein the ready status indicates whether a respective port of the ready mask is available to be serviced; determine, for each port, whether the eligible status and the ready status indicate that port is both eligible and ready; and schedule, in response to a determination that at least one port has been determined to be both eligible and ready, each of the at least one port that has been determined to be both eligible and ready.

Example 14 includes the subject matter of Example 13, and wherein to determine whether the eligible status and the ready status for each port indicates whether the at least one port of the plurality of ports is both eligible and ready comprises to compare, in response to a determination that the determined ready mask indicates that at least one ready port is indicated in the ready mask, the retrieved eligible mask and the determined ready mask.

Example 15 includes the subject matter of any of Examples 13 and 14, and wherein to schedule each of the at least one port that has been determined to be both eligible and ready comprises to select a lowest numbered port of the at least one port that does not create a spacing violation and schedule the selected lowest numbered port.

Example 16 includes the subject matter of any of Examples 13-15, and wherein the adaptive schedule execution management circuitry is further to skip, in response to a determination that the determined ready mask indicates that no ready ports are indicated in the ready mask, the round.

Example 17 includes the subject matter of any of Examples 13-16, and wherein to configure the eligibility table comprises to determine a minimal service rate for each of the plurality of ports; determine a total number of rounds of the eligibility table, wherein the total number of rounds comprises the plurality of rounds; determine a maximum number of eligible ports for each of the plurality of rounds; determine a plurality of speed bins as a factor of the determined total number of rounds of the eligibility table; classify each of the plurality of ports into a respective one of the plurality of speed bins; and populate an eligible state for each of the plurality of ports for each of the plurality of rounds of the eligibility table.

Example 18 includes the subject matter of any of Examples 13-17, and wherein to determine the minimal service rate for each of the plurality of ports comprises to determine the minimal service rate for each of the plurality of ports based on a port speed associated with each of the plurality of ports and a minimum average packet size.

Example 19 includes the subject matter of any of Examples 13-18, and wherein to determine the plurality of rounds for the eligibility table comprises to determine the plurality of rounds for the eligibility table based on a port speed associated with each of the plurality of ports.

Example 20 includes the subject matter of any of Examples 13-19, and wherein to determine the maximum number of eligible ports for each of the plurality of rounds comprises to (i) identify a lowest minimal service rate from the minimal service rates determined for each of the plurality of ports and (ii) determine the maximum number of eligible ports for each of the plurality of rounds based on the identified lowest minimal service rate.

Example 21 includes the subject matter of any of Examples 13-20, and wherein to classify each of the plurality of ports into a respective one of the plurality of speed bins comprise to classify each of the plurality of ports based on at least one of a corresponding minimal service rate determined for each of the plurality of ports and a service round interval corresponding to each of the plurality of speed bins.

Example 22 includes the subject matter of any of Examples 13-21, and wherein to populate the eligible state for each of the plurality of ports for each of the plurality of rounds of the eligibility table comprises to populate the eligible state based on the classification of each of the plurality of ports for each of the plurality of speed bins in ascending order.

Example 23 includes the subject matter of any of Examples 13-22, and wherein to populate the eligible state for each of the plurality of ports for each of the plurality of rounds of the eligibility table comprises to populate the eligible state based on a minimal service rate requirement.

Example 24 includes the subject matter of any of Examples 13-23, and wherein to populate the eligible state for each of the plurality of ports for each of the plurality of rounds of the eligibility table further comprises to perform a jitter reduction operation on the eligibility table.

Example 25 includes a switch for adaptive network packet egress scheduling, the switch comprising means for configuring an eligibility table for a plurality of ports of the switch, wherein the eligibility table includes a plurality of rounds; means for retrieving an eligible mask corresponding to a round of a plurality of rounds of the eligibility table presently being scheduled, wherein the eligible mask indicates an eligible status of each of the plurality of ports, and wherein the eligible status indicates whether a respective port of the eligible mask is eligible to be serviced in the round; means for determining a ready mask that indicates a ready status of each of the plurality of ports, wherein the ready status indicates whether a respective port of the ready mask is available to be serviced; means for determining, for each port, whether the eligible status and the ready status indicate that port is both eligible and ready; and means for scheduling, in response to a determination that at least one port has been determined to be both eligible and ready, each of the at least one port that has been determined to be both eligible and ready.

The invention claimed is:

1. A switch for adaptive network packet egress scheduling, the switch comprising:
   first circuitry to configure an eligibility table for a plurality of ports, wherein the eligibility table includes a plurality of rounds; and
   second circuitry to:
      retrieve an eligible mask corresponding to a round of the plurality of rounds of the eligibility table presently being scheduled, wherein the eligible mask indicates an eligible status of at least one of the plurality of ports, and wherein the eligible status indicates whether a respective port of the eligible mask is eligible to be serviced in the round,
      determine a ready mask that indicates a ready status of at least one of the plurality of ports, wherein the ready status indicates whether a respective port of the ready mask is available to be serviced,
      determine, for at least one port, whether the eligible status and the ready status indicate that at least one port is both eligible and ready, and
      schedule, in response to a determination that at least one port has been determined to be both eligible and ready, the at least one of the at least one port that has been determined to be both eligible and ready.

2. The switch of claim 1, wherein to determine whether the eligible status and the ready status for at least one port indicates whether the at least one port of the plurality of ports is both eligible and ready comprises to compare, in response to a determination that the determined ready mask indicates that the at least one ready port is indicated in the ready mask, the retrieved eligible mask and the determined ready mask.

3. The switch of claim 1, wherein to schedule at least one of the at least one port that has been determined to be both eligible and ready comprises to select a lowest numbered port of the at least one port that does not create a spacing violation and schedule the selected lowest numbered port.

4. The switch of claim 1, wherein the second circuitry is further to skip, in response to a determination that the determined ready mask indicates that no ready ports are indicated in the ready mask, the round.

5. The switch of claim 1, wherein to configure the eligibility table comprises to:
   determine a lower service rate for at least one of the plurality of ports;
   determine a total number of rounds of the eligibility table, wherein the total number of rounds comprises the plurality of rounds;
   determine an upper number of eligible ports for at least one of the plurality of rounds;
   determine a plurality of speed bins as a factor of the determined total number of rounds of the eligibility table;
   classify at least one of the plurality of ports into a respective one of the plurality of speed bins; and
   populate an eligible state for at least one of the plurality of ports for at least one of the plurality of rounds of the eligibility table.

6. The switch of claim 5, wherein to determine the lower service rate for at least one of the plurality of ports comprises to determine the lower service rate for at least one of the plurality of ports based on a port speed associated with at least one of the plurality of ports and an average packet size.

7. The switch of claim 5, wherein to determine the plurality of rounds for the eligibility table comprises to determine the plurality of rounds for the eligibility table based on a port speed associated with at least one of the plurality of ports.

8. The switch of claim 5, wherein to determine the upper number of eligible ports for at least one of the plurality of rounds comprises to (i) identify a lowest lower service rate from the lower service rates determined for at least one of the plurality of ports and (ii) determine the upper number of eligible ports for at least one of the plurality of rounds based on the identified lowest lower service rate.

9. The switch of claim 5, wherein to classify at least one of the plurality of ports into a respective one of the plurality of speed bins comprise to classify at least one of the plurality of ports based on at least one of a corresponding lower service rate determined for at least one of the plurality of ports and a service round interval corresponding to at least one of the plurality of speed bins.

10. The switch of claim 5, wherein to populate the eligible state for at least one of the plurality of ports for at least one of the plurality of rounds of the eligibility table comprises to populate the eligible state based on the classification of at least one of the plurality of ports for at least one of the plurality of speed bins in ascending order.

11. The switch of claim 5, wherein to populate the eligible state for at least one of the plurality of ports for at least one of the plurality of rounds of the eligibility table comprises to populate the eligible state based on a lower service rate criteria.

12. The switch of claim 5, wherein to populate the eligible state for at least one of the plurality of ports for at least one of the plurality of rounds of the eligibility table further comprises to perform a jitter reduction operation on the eligibility table.

13. One or more non-transitory computer-readable storage media comprising a plurality of instructions stored thereon that, in response to being executed, cause a switch to:
configure an eligibility table for a plurality of ports of the switch, wherein the eligibility table includes a plurality of rounds;
retrieve an eligible mask corresponding to a round of a plurality of rounds of the eligibility table presently being scheduled, wherein the eligible mask indicates an eligible status of at least one of the plurality of ports, and wherein the eligible status indicates whether a respective port of the eligible mask is eligible to be serviced in the round;
determine a ready mask that indicates a ready status of at least one of the plurality of ports, wherein the ready status indicates whether a respective port of the ready mask is available to be serviced;
determine, for at least one port, whether the eligible status and the ready status indicate that port is both eligible and ready; and
schedule, in response to a determination that at least one port has been determined to be both eligible and ready, the at least one of the at least one port that has been determined to be both eligible and ready.

14. The one or more non-transitory computer-readable media of claim 13, wherein to determine whether the eligible status and the ready status for at least one port indicates whether the at least one port of the plurality of ports is both eligible and ready comprises to compare, in response to a determination that the determined ready mask indicates that at least one ready port is indicated in the ready mask, the retrieved eligible mask and the determined ready mask.

15. The one or more non-transitory computer-readable media of claim 13, wherein to schedule at least one of the at least one port that has been determined to be both eligible and ready comprises to select a lowest numbered port of the at least one port that does not create a spacing violation and schedule the selected lowest numbered port.

16. The one or more non-transitory computer-readable media of claim 13, comprising instructions stored thereon, that in response to being executed, cause the switch to skip, in response to a determination that the determined ready mask indicates that no ready ports are indicated in the ready mask, the round.

17. The one or more non-transitory computer-readable media of claim 13, wherein to configure the eligibility table comprises to:
determine a lower service rate for at least one of the plurality of ports;
determine a total number of rounds of the eligibility table, wherein the total number of rounds comprises the plurality of rounds;
determine a upper number of eligible ports for at least one of the plurality of rounds;
determine a plurality of speed bins as a factor of the determined total number of rounds of the eligibility table;
classify at least one of the plurality of ports into a respective one of the plurality of speed bins; and
populate an eligible state for at least one of the plurality of ports for at least one of the plurality of rounds of the eligibility table.

18. The one or more non-transitory computer-readable media of claim 17, wherein to determine the lower service rate for at least one of the plurality of ports comprises to determine the lower service rate for at least one of the plurality of ports based on a port speed associated with at least one of the plurality of ports and an average packet size.

19. The one or more non-transitory computer-readable media of claim 17, wherein to determine the plurality of rounds for the eligibility table comprises to determine the plurality of rounds for the eligibility table based on a port speed associated with at least one of the plurality of ports.

20. The one or more non-transitory computer-readable media of claim 17, wherein to determine the upper number of eligible ports for at least one of the plurality of rounds comprises to (i) identify a lowest lower service rate from the lower service rates determined for at least one of the plurality of ports and (ii) determine the upper number of eligible ports for at least one of the plurality of rounds based on the identified lowest lower service rate.

21. The one or more non-transitory computer-readable media of claim 17, wherein to classify at least one of the plurality of ports into a respective one of the plurality of speed bins comprise to classify at least one of the plurality of ports based on at least one of a corresponding lower service rate determined for at least one of the plurality of ports and a service round interval corresponding to at least one of the plurality of speed bins.

22. The one or more non-transitory computer-readable media of claim 17, wherein to populate the eligible state for at least one of the plurality of ports for at least one of the plurality of rounds of the eligibility table comprises to populate the eligible state based on the classification of at least one of the plurality of ports for at least one of the plurality of speed bins in ascending order.

23. The one or more non-transitory computer-readable media of claim 17, wherein to populate the eligible state for at least one of the plurality of ports for at least one of the plurality of rounds of the eligibility table comprises to populate the eligible state based on a lower service rate criteria.

24. The one or more non-transitory computer-readable media of claim 17, wherein to populate the eligible state for at least one of the plurality of ports for at least one of the plurality of rounds of the eligibility table further comprises to perform a jitter reduction operation on the eligibility table.

25. A switch for adaptive network packet egress scheduling, the switch comprising:
means for configuring an eligibility table for a plurality of ports of the switch, wherein the eligibility table includes a plurality of rounds;
means for retrieving an eligible mask corresponding to a round of a plurality of rounds of the eligibility table presently being scheduled, wherein the eligible mask indicates an eligible status of at least one of the plurality of ports, and wherein the eligible status indicates whether a respective port of the eligible mask is eligible to be serviced in the round;
means for determining a ready mask that indicates a ready status of at least one of the plurality of ports, wherein the ready status indicates whether a respective port of the ready mask is available to be serviced;

means for determining, for at least one port, whether the eligible status and the ready status indicate that port is both eligible and ready; and means for scheduling, in response to a determination that at least one port has been determined to be both eligible and ready, at least one of the at least one port that has been determined to be both eligible and ready.

26. The switch of claim 1, comprising the plurality of ports.

27. An apparatus comprising:
an interface and
a switch chip coupled to the interface and comprising circuitry to allocate switch fabric bandwidth based on port speed, port eligibility, and port readiness indicators, wherein the port readiness indicators comprise a mask that indicates a ready status of at least one of the plurality of ports and the ready status indicates whether a respective port of the mask is available to be serviced.

28. The apparatus of claim 27, comprising a switch fabric.

29. The apparatus of claim 28, comprising the plurality of ports coupled to the switch chip.

* * * * *